(No Model.)

C. W. FIRNHABER.
CORSET STIFFENER.

No. 359,015. Patented Mar. 8, 1887.

Attest:
Cour. A. Cooper.
A. E. Hansmann

Carl W. Firnhaber,
Inventor.
By Foster & Freeman
Attys.

UNITED STATES PATENT OFFICE.

CARL W. FIRNHABER, OF PARIS, FRANCE.

CORSET-STIFFENER.

SPECIFICATION forming part of Letters Patent No. 359,015, dated March 8, 1887.

Application filed October 23, 1885. Serial No. 180,730. (No model.)

*To all whom it may concern:*

Be it known that I, CARL W. FIRNHABER, a subject of the Emperor of Germany, and residing in the city of Paris, France, have invented certain new and useful Improvements in Corset-Stiffeners, of which the following is a specification.

My invention is a corset-stiffener consisting of a series of short pieces or blades beveled and overlapped at the ends and bound together by one or more winding threads, as fully set forth hereinafter, so as to constitute a continuous flexible strip of substantially uniform thickness, having surfaces that extend in the same continuous plane, in which the parts are strongly united together.

Figure 1:
Figure 2:
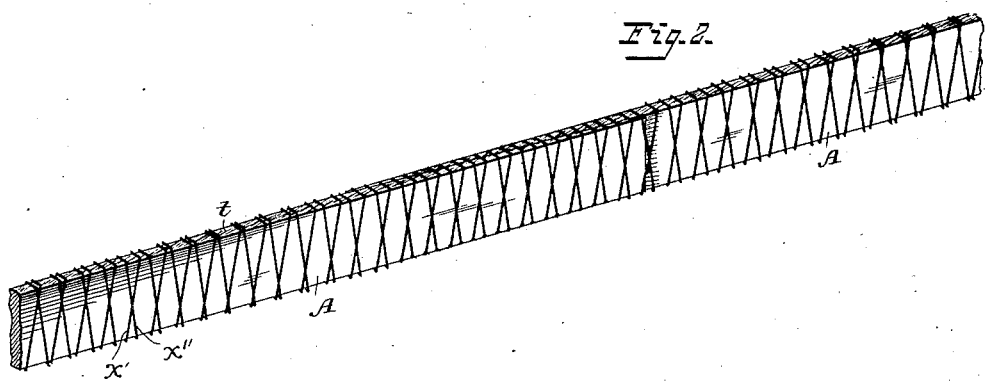
Figure 3:
Figure 4:

In the drawings, Figure 1 is an edge view showing the manner of beveling the contiguous faces of the overlapped portions of the blades. Fig. 2 is a perspective view of the completed strip; Fig. 3, an edge view of one of the blades, showing the notches therein; Fig. 4, a side view of the portion shown in Fig. 3.

A A represent the strips of whalebone, horn, or other material which it is desired to connect to form a continuous strip or band for use in the manufacture of corsets, bustles, hoop-skirts, or other articles of wearing-apparel, the ends of the contiguous strips being overlapped for a short distance, and the overlapping portions being shaved or cut away to form beveled faces $x$, Fig. 3, so that the thickness of the strip where the parts are overlapped shall not be greater than at other portions, and its side surfaces shall extend in continuous planes.

In the manufacture of the continuous strip the ends of the contiguous strips, after being beveled as shown in Fig. 1, and the compound strip, is passed through any ordinary winding-machine, whereby two or more separate threads are wound round the strip in reverse directions, so as to form coils about one-eighth of an inch apart, which serve to bind the overlapped parts together, so that a compound strip of any desired length may be formed out of comparatively short sections.

In order to prevent the slipping and loosening of the coils at the points where the strips are overlapped, I score or notch the edge or edges of each strip opposite the beveled face, forming transverse cuts or notches $s$, Figs. 3 and 4, into which the binding-threads enter, so that one strip cannot be drawn longitudinally away from the other without fracturing the threads which pass through the adjacent notches of the adjacent strips.

To prevent the slipping of the binding-threads upon the body of the strips between the parts where they are notched, I apply a coating, $t$, of sizing, glue, cement, or other suitable material to the edge of the wound strip, so as to cause the transverse portions of the threads to adhere to the edge, while the remaining portions can bend or play upon the strip when the same is bent or coiled, thus accommodating themselves to the movements of the strip without the breaking of the threads which would otherwise result if they were cemented to the body of the strip throughout their entire length.

I am aware that short strips of whalebone or similar material have heretofore been overlapped and secured together at their ends to form corset-stiffeners; and I therefore do not broadly claim such construction; but I do claim and desire to secure by Letters Patent—

1. As a new article of manufacture, a corset-stiffener consisting of a flexible strip composed of a series of separate blades, each of which has beveled ends notched at the side edges, said blades overlapped at the ends and secured together with their faces in the same continuous plane by continuous threads spirally wound around the strip and cemented to the side edges thereof, substantially as described.

2. As a new article of manufacture, a corset-stiffener consisting of a flexible strip composed of two or more separate blades having beveled and overlapped ends and notched side edges, said blades secured together with faces in the same continuous planes by binding-threads wound around the entire strip, substantially as described.

In testimony whereof I have signed my name to this specification in the presence of two subscribing witnesses.

CARL W. FIRNHABER.

Witnesses:
FREEMAN D. MARCKWALD,
OTTO BRUNNARIUS.